US011827336B2

(12) United States Patent
Maver et al.

(10) Patent No.: US 11,827,336 B2
(45) Date of Patent: Nov. 28, 2023

(54) PROPELLER BLADE ANGLE CLOSED LOOP CONTROL BY SOLENOID MODULATION (71) Applicant: Hamilton Sundstrand Corporation, Charlotte, NC (US)

(72) Inventors: Timothy Maver, Glastonbury, CT (US); Julien Lassalle, Saint Jean Lagineste (FR); Thibaut Marger, Béduer (FR); Gregory Giddings, Windsor, CT (US); Charles L. DeGeorge, Suffield, CT (US); Stephen J. Bukowinski, Windsor Locks, CT (US); Romain Bouloc, Saint Félix (FR)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 664 days.

(21) Appl. No.: 16/717,547

(22) Filed: Dec. 17, 2019

(65) Prior Publication Data
US 2020/0189721 A1 Jun. 18, 2020

(30) Foreign Application Priority Data

Dec. 18, 2018 (EP) .................................... 18213630

(51) Int. Cl.
*B64C 11/38* (2006.01)
*B64C 11/40* (2006.01)
(Continued)

(52) U.S. Cl.
CPC ............ *B64C 11/385* (2013.01); *B64C 11/40* (2013.01); *B64C 11/303* (2013.01); *B64C 11/44* (2013.01);
(Continued)

(58) Field of Classification Search
CPC ..... B64C 11/40; B64C 11/385; B64C 11/303; B64C 11/38; F01D 7/00; F01D 7/02;
(Continued)

(56) References Cited

U.S. PATENT DOCUMENTS 3,814,537 A 6/1974 Stoltman
5,174,718 A * 12/1992 Lampeter ................ B64C 11/38
416/157 R (Continued)

FOREIGN PATENT DOCUMENTS

EP 0598067 B1 6/1995
EP 3361072 A1 8/2018
(Continued)

OTHER PUBLICATIONS

EPO Official Letter for Application No. 18213630.9, dated Oct. 19, 2022, 4 pages.
(Continued)

*Primary Examiner* — Christopher Verdier
(74) *Attorney, Agent, or Firm* — CANTOR COLBURN LLP (57) ABSTRACT

A system for controlling a propeller having a plurality of blades having a primary control system and a backup control system. The primary control system including a sensor responsive to a propeller state, and a controller connected to the sensor and to an electrohydraulic control actuator. The electrohydraulic control actuator is connected via a bypass valve to a hydraulic actuator that controls at least a blade angle of a blade of the propeller. The controller generating commands to the electrohydraulic control actuator based on at least the propeller state. The backup control system including a second controller, an electrohydraulic solenoid operably connected to the bypass valve. The backup control system is operable to hydraulically disable the primary
(Continued)

control system via the bypass valve upon the occurrence of a selected condition, the second controller modulates the operation of the electrohydraulic solenoid to control the bypass actuator based on the propeller state.

20 Claims, 2 Drawing Sheets (51) Int. Cl.
*B64C 11/30* (2006.01)
*B64C 11/44* (2006.01)
*B64D 27/02* (2006.01)

(52) U.S. Cl.
CPC .. *B64D 2027/026* (2013.01); *F05D 2220/323* (2013.01); *F05D 2260/76* (2013.01); *F05D 2260/79* (2013.01); *F05D 2260/83* (2013.01); *F05D 2270/62* (2013.01)

(58) Field of Classification Search
CPC ............. F05D 2260/74; F05D 2260/75; F05D 2260/76; F05D 2260/79
See application file for complete search history.

(56) References Cited

U.S. PATENT DOCUMENTS

| | | | | |
|---|---|---|---|---|
| 5,186,608 | A | * | 2/1993 | Bagge ............... B64C 11/38 416/37 |
| 5,836,743 | A | * | 11/1998 | Carvalho ............ B64C 11/385 416/157 R |
| 5,897,293 | A | | 4/1999 | Arel et al. |
| 6,059,528 | A | | 5/2000 | Danielson et al. |
| 6,077,040 | A | * | 6/2000 | Pruden ............... B64C 11/38 416/157 R |
| 2016/0312742 | A1 | | 10/2016 | Himmelmann |

FOREIGN PATENT DOCUMENTS

| | | |
|---|---|---|
| EP | 3403923 A1 | 11/2018 |
| WO | 9303960 A1 | 3/1993 |

OTHER PUBLICATIONS

Extended European Search Report for European Application No. 18213630.9; Date of Completion: May 23, 2019; dated Jul. 12, 2019; 9 Pages.

* cited by examiner

FIG. 1

FIG. 2 ns. There exists a need, therefore, for an electronic propeller control system with an electronic backup, which is reliable, provides accurate propeller speed control, and provides due consideration to weight and complexity for increasing flight efficiency and decreased costs, respectively.

PROPELLER BLADE ANGLE CLOSED LOOP CONTROL BY SOLENOID MODULATION

CROSS-REFERENCE TO RELATED APPLICATIONS

This application claims the benefit of European Application Serial No. 18213630.9 filed Dec. 18, 2018, the disclosure of which is incorporated herein by reference in its entirety.

TECHNICAL FIELD

Exemplary embodiments of the present disclosure pertain to the art of propellers, and more particularly, to an electronic system with a backup system for controlling and monitoring propeller blade functions, and specifically blade angle changes.

BACKGROUND

Variable pitch propeller designs often make use of a simple pitch change actuator to accommodate the high forces necessary to adjust pitch. Accordingly, hydraulic pressure required to adjust propeller blade pitch or angle may be supplied directly to the coarse pitch and fine pitch chambers of the pitch change actuator usually found in such systems, on command from a propeller control. Variable pitch propeller systems incorporate mechanisms to protect the systems against uncommanded blade angle excursions towards low pitch or low blade angle, typically in the event of a primary control device failure.

An electronic control system is typically operable to control and monitor blade angle thereby changing blade angle as demanded by flight conditions. In the typical case, such commands are implemented by an electronically operated valve, which directs and cuts off hydraulic fluid to the coarse and fine pitch chambers of the pitch change actuator.

In the event that there is an electronic failure within the propeller control system, or in some designs, the loss of aircraft electrical power, a backup system must be deployed, which system is typically mechanical, to monitor, control and adjust the pitch change actuator for adjusting blade angle in accordance with flight conditions. In this manner, electronic malfunctions, which could cause blade angle to send the propeller into overspeed conditions and high negative thrust, can be avoided.

In legacy systems, a mechanical overspeed governor may have been used as a backup device in a system in fluid communication with a protection valve to address malfunctions. The overspeed governor was commonly a fly weight-actuated, metering valve, which, when invoked, controlled flow of hydraulic fluid from a protection valve. As implemented, the overspeed governor was connected such that, in the event of a malfunction in the existing electronic controls and valves resulting in an inadvertent command of blade angle such that overspeed was reached, the mechanical backup system, and specifically the overspeed governor, acted to override the primary controls to adjust blade angle. However, with a fly-ball governor, precise control of the blade angles under the malfunction condition is not readily possible because of the imprecise nature of the device. Therefore, in the described embodiments a more precise means of control of the blade angles is desired.

In currently available electronic propeller control systems, with mechanical backups, the overall system size, complexity, and maintenance can be problematic with regard to important weight, cost, and operational considerations. There exists a need, therefore, for an electronic propeller control system with an electronic backup, which is reliable, provides accurate propeller speed control, and provides due consideration to weight and complexity for increasing flight efficiency and decreased costs, respectively.

BRIEF DESCRIPTION

Disclosed herein in an embodiment is a system for controlling a propeller having a plurality of blades having a primary control system and a backup control system. The primary control system including a sensor responsive to a propeller state, and a controller connected to the sensor and to an electrohydraulic control device. The electrohydraulic control device connected via a bypass valve to a hydraulic actuator that controls at least a blade angle of a blade of the propeller. The controller generates commands to the electrohydraulic control device based on at least the propeller state. The backup control system including a second controller, and an electrohydraulic solenoid operably connected to the bypass valve. The backup control system is operable to hydraulically disable the primary control system via the bypass valve upon the occurrence of a selected condition, the second controller modulates the operation of the electrohydraulic solenoid to control the bypass valve based on the propeller state.

In addition to one or more of the features described above, or as an alternative to any of the foregoing embodiments, the system may include that the backup control system is invoked if the propeller state is determined to be incompatible with selected flight requirements.

In addition to one or more of the features described above, or as an alternative to any of the foregoing embodiments, the system may include that the blades of the propeller have in-flight blade angles including a minimum in-flight blade angle and a desired in-flight blade angle, and wherein one of the conditions comprises said in-flight blade angle falling below the minimum blade angle.

In addition to one or more of the features described above, or as an alternative to any of the foregoing embodiments, the system may include that the backup control system is configured to stop the blade angle from falling further below the minimum blade angle and for returning the blade angle to the desired in-flight blade angle.

In addition to one or more of the features described above, or as an alternative to any of the foregoing embodiments, the system may include that the sensor includes at least one of a rotary variable differential transformer (RVDT) operable to determine blade angle.

In addition to one or more of the features described above, or as an alternative to any of the foregoing embodiments, the system may include that the bypass valve is a single protection valve configured to cut off control fluid from the electrohydraulic control actuator to the hydraulic actuator based upon the occurrence of the selected condition.

In addition to one or more of the features described above, or as an alternative to any of the foregoing embodiments, the system may include that the single protection valve is operable to invoke each of a plurality of backup functions as required by the conditions.

In addition to one or more of the features described above, or as an alternative to any of the foregoing embodiments, the system may include that the blades of said propeller have a minimum in-flight blade angle, and wherein the plurality of backup functions include at least one a minimum in-flight blade angle control function and a feathering function.

In addition to one or more of the features described above, or as an alternative to any of the foregoing embodiments, the system may include that the minimum in-flight blade angle control function is based on the modulation of the electrohydraulic solenoid, and a feathering function is based on a feathering solenoid.

In addition to one or more of the features described above, or as an alternative to any of the foregoing embodiments, the system may include that the bypass valve is operably in fluid communication with each of the electrohydraulic solenoid and the feathering solenoid.

In addition to one or more of the features described above, or as an alternative to any of the foregoing embodiments, the system may include that the hydraulic actuator includes a coarse pitch actuation mechanism and a fine pitch actuation mechanism, the bypass valve operable to port an actuating fluid to at least one of the coarse and fine pitch actuation mechanisms for achieving the fluid communication with at least one of coarse and fine blade angle adjustment on command by the backup system.

In addition to one or more of the features described above, or as an alternative to any of the foregoing embodiments, the system may include that the plurality of backup functions are operably configured to port the actuating fluid through the channels to each of the coarse and fine pitch actuation mechanisms for achieving coarse and fine blade angle adjustment.

In addition to one or more of the features described above, or as an alternative to any of the foregoing embodiments, the system may include that the hydraulic actuator includes a coarse pitch actuation mechanism and a fine pitch actuation mechanism, the bypass valve being operable to port an actuating fluid to at least one of the coarse and fine pitch actuation mechanisms for achieving the fluid communication with at least one of coarse and fine blade angle adjustment on command by the backup system.

In addition to one or more of the features described above, or as an alternative to any of the foregoing embodiments, the system may include that the controller is configured to execute a method that includes receiving a signal indicative of the propeller state, comparing the signal with a reference set point for the propeller state to establish an error signal for the propeller state, applying the error signal for the propeller state to a control function to establish a duty cycle command, and applying the duty cycle command to the electrohydraulic control actuator under selected conditions.

In addition to one or more of the features described above, or as an alternative to any of the foregoing embodiments, the system may include that the control function is a proportional-integral controller.

In addition to one or more of the features described above, or as an alternative to any of the foregoing embodiments, the system may include that the applying the duty cycle is implemented with a pulse width modulation of the electrohydraulic control actuator, the duty cycle in a range of 0 to 100%, the pulse width modulation operating at a frequency of at least one of at least 10 Hz, at least 20 Hz, at least 50 Hz and at least 100 Hz.

In addition to one or more of the features described above, or as an alternative to any of the foregoing embodiments, the system may include that the electrohydraulic control actuator exhibits a bandwidth of at least one of at least 10 Hz, at least 20 Hz, at least 50 Hz and at least 100 Hz.

In addition to one or more of the features described above, or as an alternative to any of the foregoing embodiments, the system may include that the backup control system is independent of the primary control system.

Also described herein in an embodiment is a method for controlling a propeller having a plurality of blades. The method includes operably connecting a sensor responsive to a propeller state, wherein the propeller state includes at least one of a propeller speed and a propeller blade angle, and operably connecting a controller to the sensor and to an electrohydraulic control actuator, wherein the electrohydraulic control actuator is operably connected via a bypass valve to a hydraulic actuator, the hydraulic actuator being operable to control at least a blade angle of a blade of the propeller, the controller generating commands to the electrohydraulic control actuator based on at least the propeller state, and being operably connecting a second controller to the sensor and an electrohydraulic solenoid being operably connected to the bypass valve, the electrohydraulic solenoid system being operable to hydraulically disable the electrohydraulic control actuator via the bypass valve upon the occurrence of a selected condition including at least one of testing, manual override, and a malfunction in the electrohydraulic control valve, the second controller being operable to modulate the operation of the electrohydraulic solenoid to control the bypass actuator based on the propeller state.

In addition to one or more of the features described above, or as an alternative to any of the foregoing embodiments, the method may include that the second controller is further configured to receive a signal indicative of the propeller state, compare the signal with a reference set point for the propeller state to establish an error signal for the propeller state, apply the error signal for the propeller state to a control function to establish a duty cycle command, and apply the duty cycle command to the electrohydraulic control actuator under selected conditions.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
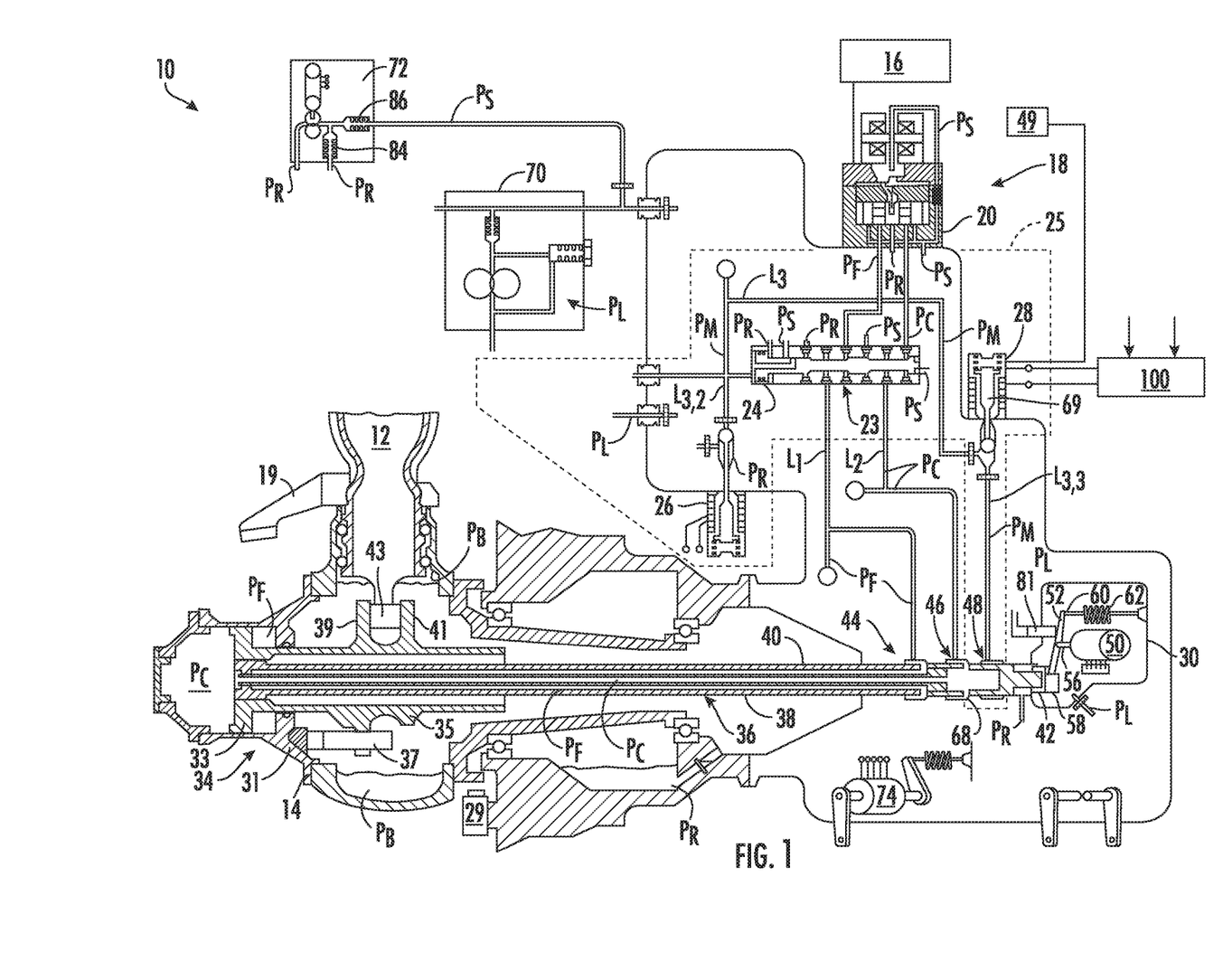
FIG. 1 is a schematic view of the propeller control system including an electronic control and mechanical backup system, controlled by a single protection valve in accordance with an embodiment.

Referring now to FIG. 1, there is depicted an electronic/hydraulic propeller control system, designated generally as 10. System 10 is used to monitor and change blade pitch angles of counterweighted blades 12 to a desired in-flight blade angle, mounted as known in the art, to propeller hub 14, as shown in the figure. System 10 generally includes an electronic control 16 and a hydromechanical control portion 18. Portion 18 generally includes control valve 20, used by control 16, a protection valve 24 also used in part by control 16, a backup system 25, as indicated by the dotted lines, including protection valve 24, a protection solenoid 69, a secondary pitch control system 28. A beta angle feedback sensing system 30, pitch change actuator 34, and transfer tube 36 are also provided. Additional elements are included in both the electronic and hydromechanical system portions, which elements are discussed in detail below.

Hydraulic pressure, for actuating the various mechanisms disclosed herein, is indicated generally in FIG. 1 by the double lines depicting tubing, and is designated more specifically in the figure and throughout the text by the $P_{Subscript}$ designations, wherein $P_S$ is supply pressure, $P_C$ is coarse pitch change pressure, $P_F$ is fine pitch change pressure, $P_L$ is lube pressure, $P_R$ is return pressure also denoted as drain, $P_B$ is barrel lube pressure, and $P_M$ is mechanical backup system pressure.

Electronic control 16 preferably includes interfaces to integrate the same with other aircraft systems. Accordingly, a communication link between control 16 and the other aircraft systems in a known manner is provided via an electronic engine control system so that control 16 can gather flight data for controlling the propeller and communicate with these other aircraft systems. Accordingly, as information is gathered via this link, blade angles can be adjusted to comply with specific flight conditions, in accordance with the system 10 as described herein.

Electronic control systems, such as control 16, have been implemented as control systems for achieving more accurate control over blade angle monitoring, control and change. Accordingly, electronic control 16 functions with electrohydraulic control valve 20 through protection valve 24 for controlling the metering of hydraulic fluid $P_F$ and $P_C$ to and from actuator 34 for both fine, i.e., low pitch, and coarse, i.e., high pitch, control and adjustment of the pitch angle of propeller blades 12. Preferably, electronic propeller control 16 is a dual channel microprocessor based unit, having a primary channel and a backup channel, which provides closed loop control of the pitch of propeller blades 12. The control 16 functions to control speed governing, synchrophasing, beta control, feathering and unfeathering. In addition to these functions, the unit will detect, isolate, and accommodate control system faults. The control 16 is preferably programmed in a known manner to perform the functions as set forth above. Electronic propeller control 16 is connected and in communication with control valve 20. Accordingly, control 16 is operational to send electronic signals to valve 20 for initiating and maintaining hydraulic fluid metering for operating actuator 34, described in detail below.

Electronic control 16 also controls propeller RPM wherein a governing RPM is selected from one of several values stored in software provided in control 16. Control 16 will compare sensed propeller RPM to the selected governing RPM and to correct any diversion from the governing RPM, control 16 will calculate and invoke a pitch change in blades 12 by way of an electrohydraulic control valve 20. Accordingly, when multiple propellers of a multiple propeller aircraft have stabilized at a selected governing RPM, synchrophaser control is initiated. A control 16 is provided for each of the propellers in the multi propeller system, and in accordance with known means, a master and slave arrangement is provided for controlling RPM differentials between the propellers. That is, small changes will be made to the reference speed of the slave propeller, whichever is selected, to achieve a constant phase relationship with the master propeller.

Electronic control 16 is designed to automatically compensate for any single or any combination of faults that may be experienced thereby. Accordingly, a pilot will be advised of a fault that occurs in control 16 via signals controlled by control 16. Any combination of faults that would disable both channels of control 16 are accommodated by one or more aspects of a backup system 25, and specifically the pitch control system 28 and even mechanical back up system 25 Accordingly, the safe completion of the flight is allowed regardless of the faults. Fault accommodation by control 16 includes the automatic transfer of control to the backup system or protection channel thereof, if certain faults are detected by the primary channel or by any of the electromechanical devices the control interfaces with. The accommodations further include the automatic re-initialization of a primary channel when confrontational faults are detected, and restoration of control by the primary channel when health is restored. Finally, accommodation includes the automatic reversion to alternate control modes when signals required for operation in normal control modes are not available to either channel.

Control valve 20 is preferably in the form of an electrohydraulic, four-way jet pipe, servo valve, as is known in the art that controls blade pitch rate by metering hydraulic flow to pitch change actuator 34 hereinafter referred to as actuator 34. The flow of hydraulic pressure $P_F$, $P_C$ supplied via electrohydraulic control valve 20 is proportional to a milliamp electrical signal received from control 16 over at least one of its two independent electrical channels, after control 16 has communicated with the other aircraft systems to determine the appropriate blade angle of the propeller. Electrohydraulic control valve 20 has two independent electrical channels for communication with the two electrical channels of control 16. The design of an electrohydraulic valve 20 is generally well known in the art.

An example of feedback that control 16 receives from other aircraft systems is the propeller speed feedback provided by sensors 29, positioned near blades 12 for providing blade speed data. Sensors 29 are preferably in the form of magnetic speed pickups although other sensing devices may be utilized. The pickups are adapted to be placed behind blades 12 for sensing and providing propeller speed to each channel of electronic control 16. In addition, a single coil pickup provides a remote propeller speed signal to the primary channel of control 16, to facilitate synchrophasing.

As indicated, protection valve 24 is associated with portion 18. In one mode, it is operable to direct hydraulic fluid hydraulic pressure $P_F$, $P_C$ from electrohydraulic control valve 20 to transfer tube 36 for use with actuator 34 for adjusting blade angle. Protection valve 24 is preferably in the form of a spool valve, as known in the art, although other types of valves may be utilized, having a plurality of channels 23 through which hydraulic pressure is ported. Hydraulic fluid flows from electrohydraulic control valve 20 of electronic control 16 through protection valve 24. Protection valve 24 allows backup system 25 to backup electronic control 16 and valve 20 by allowing the same to assume pitch change control authority from control 16, and valve 20, after the occurrence of an electronic malfunction, or other condition such as a testing routine or manual override. As indicated in FIG. 1, coarse pitch hydraulic pressure $P_C$ originates from valve 20 in line $L_2$ and continues in line $L_2$ to transfer tube 36 for use in controlling the pitch angle of blades 12 toward high pitch. Also, fine pitch hydraulic pressure $P_F$ flows through line $L_1$ through protection valve 24 to transfer tube 38, as shown in FIG. 1, for controlling the pitch angle of the blades 12 toward low pitch. Accordingly, in the electronic mode, protection valve 24 is aligned with electrohydraulic control valve 20 for allowing hydraulic fluid flow through lines $L_1$ and $L_2$ for fine and coarse blade pitch angle adjustment, respectively, as commanded by control 16.

In the event that electronic control 16 fails, is manually overridden, or a testing routine is implemented, protection valve 24 is operative to reposition to a protection position and cut off flow pressure $P_F$, $P_C$ as supplied from valve 20 and through lines $L_1$ and $L_2$. That is, hydraulic pressure $P_M$ is drained from protection valve 24 through a combination of lines $L_3$, $L_{3,2}$, $L_{3,3}$, of the system 25 for invoking a valve shift (leftward in FIG. 1). In general, as protection valve 24 is actuated for placing one of the backups in command, supply hydraulic pressure $P_S$ is connected with line $L_2$ for providing pressure $P_C$ to the coarse (high) side of actuator piston 33 (described below) and the fine (low) pitch side of piston 33 is ported to drain $P_R$. Actuation of the blades 12 to a coarser pitch is thereby achieved.

Supplemental to backup system(s) 25, in some configurations, counterweighted blades 12 also aid to prevent an overspeed or the minimum in-flight blade angle from being violated due to main and/or auxiliary pump failure, as opposed to control 16 malfunction. That is, in some embodiments, counterweights 19 are provided on each blade 12 to provide centrifugal twisting moments about the blade axis toward increased pitch. Accordingly, if the main hydraulic and/or the auxiliary pumps fail, blades 12 are still prevented from decreasing pitch sufficiently to cause a propeller overspeed or from violating the minimum in-flight angle.

Both electronic control 16, in combination with valve 20, and system 25 through valve 24, are capable of controlling actuator 34 via hydraulic fluid flow through transfer tube 36. Pitch change actuator 34 is preferably a linear dual acting hydraulic actuator, although other designs may be utilized, which provides the force required to react to flight loads acting on the propeller blades 12 and to affect changes in blade pitch angle. The primary components of the actuator 34 are the dome 31, piston 33, yoke shaft 35, anti-rotation arm 37, forward yoke plate 39, and aft yoke plate 41. Dome 31 is the pressure vessel, which contains the coarse hydraulic pressure, $P_C$, and fine hydraulic pressure $P_F$. The differential between coarse and fine pressures acts across piston 33 to generate the force required to change blade pitch. Piston 33 is attached to the yoke shaft 35 and translates fore and aft with the shaft as hydraulic pressure is metered to the coarse and fine pitch sides of the piston 33 by the propeller control system 10. The fore and aft yoke plates 39 and 41 are attached to the yoke shaft 35. These plates 39 and 41 allow the actuator 34 to engage trunnions 43 of propeller blades 12. Since the trunnions 43 are offset from the pitch change axis of the blades 12, the linear motion of the actuator 34 is converted to rotation of the blades 12 about their pitch change axis. Anti-rotation arm 37 acts to prevent the piston 33, yoke shaft 35 and yoke plates 39, 41 from rotating, which could cause the blade trunnions 43 to disengage from the yoke plates 39 and 41.

Transfer tube 36 is preferably comprised of two tubes 38 and 40. Inner tube 38 preferably receives hydraulic pressure $P_C$ for controlling coarse blade angle changes of blades 12. Outer concentric tube 40 is adapted to receive hydraulic pressure $P_F$ from the electrical and mechanical systems for controlling fine blade angle changes. At end 42 of transfer tube 36, a transfer bearing 68 is provided for transmitting $P_C$ and $P_F$ through windows 44, 46, 48 from lines $L_1$, $L_2$, and $L_{3,3}$, respectively. Orifice/window 48 is used to drain fluid under pressure $P_M$ from line $L_{3,3}$, for causing a shift in protection valve 24 to the protection position, as a part of secondary pitch control mechanism 28. Transfer tube 36 is rotatable with the propeller assembly and is also translatable fore and aft with the yoke shaft 35 during blade angle adjustment. The translatory motion of transfer tube 36 is used by beta angle feedback sensing system 30 to determine blade angle for use by electronic control 16, as described in detail below.

Blade angle feedback sensing system 30 is in electrical communication with electronic control 16 for providing constant updates on the blade angles of the various blades 12 comprising the propeller. Electronic control 16 uses this data from system 30 to determine when to activate electrohydraulic control valve 20, for coarsely adjusting blade angle toward higher pitch or finely adjusting blade angle toward lower pitch via the metering of hydraulic fluid through transfer tube 36 to actuator 34. The blade angle feedback system 30 includes a positon sensor such as a rotary variable differential transformer (RVDT) 50 and a lever 52, which, in combination, sense position of the transfer tube 36, from which blade angle of blades 12 is calculated. An RVDT 50 is used as opposed to an LVDT thereby allowing for a shorter envelope or volume occupied by system 30 and accordingly, by hydromechanical portion 18. As described herein, various configurations for sensors are possible. For example, in one instance the sensor may be a simple potentiometer, while in other configurations, a multi-channel multi-winding RVDT may be employed as the blade angle feedback system 30. Accordingly, weight and space is saved. RVDT 50 and lever 52 are mounted adjacent end 42 of transfer tube 36. As indicated in FIG. 1, lever 52 is pivotably mounted to a shaft 56 extending from RDVT 50. One end 58 of the lever is positioned for engagement with end 42 of transfer tube 36 and the other end 60 is attached to a statically mounted spring 62, and engaged with hydraulic piston 81, which provides resistance to lever 52 against end 42 of transfer tube 36. As the axial position of shaft 35 of actuator 34 is changed, transfer tube 36 is moved therewith. Accordingly, lever 52 pivoted on shaft 56 senses the axial movement of transfer tube 36 and RVDT 50 and uses the sensed axial movement for determining blade angle, which is then forwarded as an electrical signal of actuator position to electronic control 16. While the described embodiments regarding the position sensor are directed to an RVDT 50, such description is merely for illustration purposes. It should be appreciated that any variety of other types of position sensors are possible.

Secondary pitch control system 28 includes metering orifice/window 48 and retraction solenoid 69, which assume flow control from the electrohydraulic valve 20 when the solenoid 69 is in the normally open position and the minimum in-flight angle is breached. When the electronic propeller control 16 fails to enforce the minimum in-flight blade angle, as may be evidenced by an excessive speed of the propellers, control to enforce the minimum blade angle is switched to secondary pitch control system 28. In this manner, transfer tube 36 translates to a position indicative of minimum in-flight angle violation, to facilitate actuation of system 28. When the solenoid 69 is activated, hydraulic pressure $P_M$ on line $L_{3,3}$ is drained to atmospheric pressure, causing a pressure differential in protection valve 24 and a subsequent shift (leftward) to the protected position. As a result, the spool of protection valve 24 is shuttled left toward the protection position, where flow from the valve 20 to the actuator 34 is blocked. Line $L_1$, is drained and supply pressure $P_S$ is metered to line $L_2$ as pressure $P_C$ to actuator 34. Blade angle is thereby coarsely adjusted using actuator 34 away from the minimum in-flight angle until the blades 12 reach a steady state position.

In an embodiment, another technique is described to control inflight blade angle and avoid excessive speed of the propeller under potential backup conditions for the electronic propeller control 16. In this embodiment, a control methodology 200 (not shown in FIG. 1) is employed via controller 100 to modulate the activation and deactivation of the protection solenoid 69. The methodology 200 is configured as an iterative process to control the blade pitch, and thereby the blade speed employing a control technique that pulse width modulates (PWM) the duty cycle of the protection solenoid 69 while in the protection mode. As a result, pseudo steady state operation of the propeller blade pitch and thereby speed can be achieved during protected mode backup operation.

Controller 100 can correspond to, at least, a system that is configured to operate on an engine for controlling blade pitch in accordance with an embodiment. Controller 100 can be used to implement hardware and software components of systems capable of performing methods described herein. Generally, controller 100 sensor interfaces and communication interfaces, which connects controller 100 to additional systems and or components, e.g., an engine controller, propeller controller (not depicted) and the like. Controller 100 includes one or more processors, operably connected to a communication infrastructure (e.g., a communications bus, cross-over bar, or network). Controller 100 may include a display interface that provides graphics, textual content, and other data from the communication interface. Controller 100 may also include a main memory, such as random access memory (RAM), and can also include a secondary memory as needed. Secondary memory may include, but not be limited to other similar memory and communications for allowing computer programs or other instructions to be loaded into the controller 100. The memory may have stored therein code that when executed facilitates carrying out the methods described herein.

Figure 2:
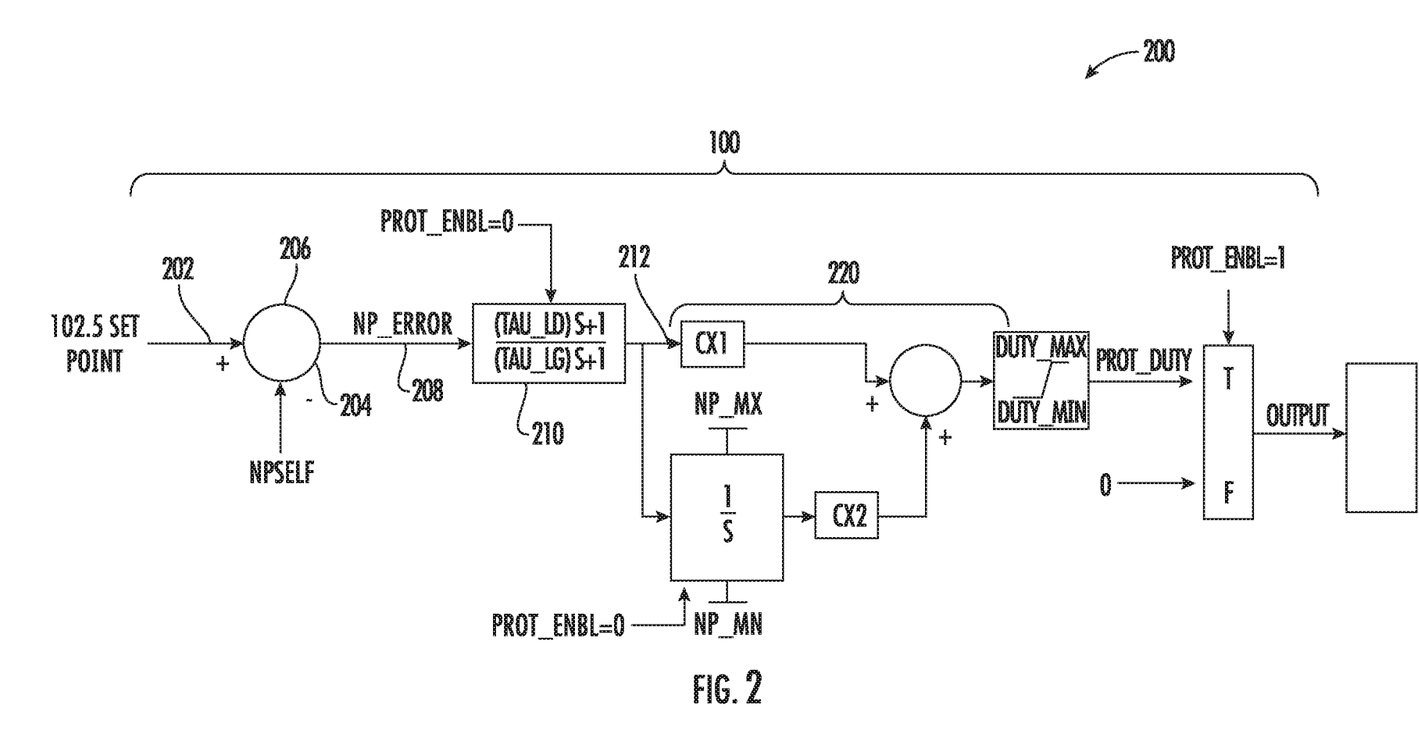
FIG. 2 depicts an example block diagram of low frequency pulse width modulation logic for the protection solenoid in accordance with an embodiment.

FIG. 2 depicts a simplified block diagram of a control algorithm and methodology 200 executed by controller 100 in accordance with an embodiment. In the figure, a reference set point 202 corresponding to a selected propeller speed is compared to the actual propeller speed denoted at 204 as depicted at summer 206. The resultant of summer 206 corresponds to a propeller speed error signal 208. The propeller speed error signal 208 is optionally filtered at filter 210 to remove unneeded or undesirable spectral content and more specifically, to compensate for RPM variations of the propeller. In an embodiment, a lead-lag type filter 210 is depicted, however other filter configurations are possible. The filtered propeller speed error signal 212 is then applied to a controller function 220 to formulate a control command based on the error. In an embodiment the controller function 220 is configured as a proportional-integral (PI) controller, however other configurations and types of controller functions 220 are possible. For example, a proportional controller, PID control topology, and the like, may be employed. In this embodiment, a PI controller function 220 is employed to address desirable responsiveness to the error signal 212 while avoiding steady state error accumulation. The output of the controller 220 establishes a commanded duty cycle for the solenoid 69 (FIG. 1) as would be applied when operating in the protected mode. In an embodiment, the duty cycle is applied in a low frequency PWM technique to control the activation duty cycle of the solenoid 69. It should be appreciated that the duty cycle can be varied from 0-100%, where 100% corresponds to the solenoid 69 being activated continuously. Moreover, in an embodiment, the solenoid 69 is operable to exhibit a bandwidth and the PWM may be applied at a frequency at least one of at least 10 Hz, at least 20 Hz, at least 50 Hz and at least 100 Hz depending on the solenoid capabilities and other considerations. Once again, depending on the capabilities of the solenoid, other frequencies are possible.

Returning now to FIG. 1, in an embodiment, as the duty cycle of the solenoid 69 is modulated, the flow of hydraulic fluid at pressure $P_M$ from the reference pressure side of the protection valve 24 is modulated. The duty cycle, and thereby the flow rate is controlled and may be proportionate to the speed error (e.g., 208) as between the reference speed and the propeller speed, as described herein. In operation, the solenoid 69 is connected to protection valve 24 such that in the event of a malfunction in electronic control 16 which causes blades 12 to reach an overspeed condition, such as too fine a pitch angle, solenoid 69 assumes control upon sensing overspeed, limits such overspeed by adjusting pitch angle in the coarse direction. That is, in other words, if a malfunction in the control 16 results in an inadvertent command of blade angle such that overspeed is reached, the backup system 25, and specifically solenoid 69 and controller 16 implementing the methodology 200 acts to override valve 20 and coarsely adjust blade angle by assuming pressure control through line $L_{3,1}$ as protection valve 24 blocks flow from electrohydraulic valve 20. Accordingly, solenoid 69 meters hydraulic pressure $P_M$ to drain (e.g., $P_R$), causing valve 24 to shift (leftward as shown) and port supply pressure $P_S$ to the coarse pitch side of the actuator piston 33 as fluid pressure $P_C$, through line $L_2$, as fine pitch fluid pressure $P_F$ is drained. In this manner, pressure $P_M$ from the protection valve 24 is metered by solenoid 69 through line $L_{3,3}$ to provide for coarse pitch adjustment until the overspeed condition is averted. Blade angle is then thereby adjusted through actuator 34 by way of transfer tube 36. It should be appreciated that as blade angle increases the propeller absorbs more power generated from the engine resulting in a lower propeller speed. Yet, as blade angle decreases it absorbs less power and with constant engine power the propeller increases in speed.

In an embodiment, tests may be performed to ensure the protection. The pitch control system 28 may be tested with the propeller unfeathered on the ground by electronic propeller control 16. That is, to run a test, the control 16 will automatically depower the solenoid 69 of the system 28 to the open position, enabling the stop, and command blade angle below the minimum in-flight setting. At this time, the secondary pitch control mechanism 28 will override the command from electronic control 16, enforcing the minimum in-flight blade angle. Control 16 will then employ feedback-sensing system 30 to determine if the blade angle being maintained by the secondary pitch control system 28 is the desired minimum in-flight blade angle, thereby checking the accuracy of system 28.

Additional elements of the system 10 include main pump 70, preferably in the form of a positive displacement gear type pump readily available in the art, which functions to provide hydraulic power required for normal pitch change operation to the actuator 34, as is known in the art. Auxiliary pump 72 is also provided for backing up the main pump in case of failure thereof. The auxiliary pump 72 preferably includes a check valve 86 for preventing back flow from portion 18 or main pump 70 and also a pressure relief 84 for preventing the generation of hydraulic pressure in excess of the pump capacity.

Further elements of system 10 include power lever angle measuring system 74 in the form of a dual RVDT, which also decreases system volume, which system 74 functions to provide control 16 with an electrical signal indicative of power lever angle in the cockpit. While an RVDT is described for measuring the power lever angle, it should be understood that other configurations and sensors are possible such as RVT's, synchros, resolvers potentiometers and the like.

In operation, electronic control 16 is the primary system for controlling blade angle of blades 12 by commanding electrohydraulic valve 20 to direct hydraulic pressure $P_C$, $P_F$ through lines $L_2$ and $L_1$ to transfer tube 36 and actuator 34. Accordingly, under normal operation, protection valve 24 is preferably aligned for flow therethrough of hydraulic pressure from valve 20, through lines $L_1$ and $L_2$. In this manner, transfer bearing 68 transmits the coarse and fine pitch hydraulic pressure $P_C$, $P_F$ from electrohydraulic flow valve 20. During normal usage, the RVDT type angle feedback sensing system 30 provides continual information to the electronic control 16, constantly updating the blade angle of blades 12.

In the event that a malfunction results in an overspeed condition, such as in the electronic propeller control 16 or electrohydraulic valve 20 or another condition such as test implementation and manual override, backup system 25 overrides control 16 and assumes blade pitch control. In this situation, backup system 25 is operative to shift protection valve 24, to cause actuator 34 to adjust the blade angle of blade 12, for ending overspeed conditions. In addition to overspeed, if a malfunction in control 16 and or valve 20 results in an inadvertent command of blade angle below the minimum in-flight blade angle, or another condition such as test or manual override arises, the secondary low pitch stop system, as described above, is caused to override control 16 and valve 20 and ultimately maintain blade angle above the minimum value, stabilizing the blades 12 through the metering of pressure $P_M$ from valve 24 through lines $L_3$, $L_{3,3}$ for coarse blade angle adjustment. Accordingly, through protection valve 24 and a combination of lines $L_{3,1}$, $L_{3,3}$, $L_3$, when the pitch control system 28 is involved, protection valve 24 is shifted to a protection position which blocks flow from and disables valve 20 to the transfer tube 36 and actuator 34. In this manner, flow through lines $L_{3,1}$, $L_3$, $L_{3,3}$ is used for porting pressure $P_C$ to the coarse side of actuator piston 33, while the fine side pressure $P_F$ is drained. Accordingly, blade angle is stabilized toward high pitch via actuator 34 driven by backup system 25, including the secondary pitch control system.

As indicated, control 16 and valve 20 may be overridden by backup system 25, specifically secondary pitch control system 28 and solenoid 69, for testing of the backups prior to flight. Control 16 also has the ability to perform its own test on the pitch control system 28 and feather solenoid prior to flight by finely adjusting blade angle until the pitch control system is activated. By receiving feedback from system 30 as to blade angle at the time of activation of pitch control system 28 and feather solenoid 26, control 16 can determine if the pitch control system 28 is activating at the proper blade angle.

In addition to the backup functionality provided by secondary pitch control system 28, feather solenoid 26 may be manually invoked for emergency feather, thereby overriding control 16 and electrohydraulic valve 20. Accordingly, with the malfunction of control 16 and other conditions, which may require the propeller to go to feather, control 16 is manually overridden by the pilot via feather solenoid 26 to change the blade angles of blades 12 in the full coarse direction to feather. In this scenario, protection valve 24 is again moved to the protective position whereby flow from valve 20 is cut off, thereby cutting off electrohydraulic control 16. Hydraulic pressure $P_M$ is drained from the protection valve 24 through line $L_{3,2}$ and supply pressure $P_S$ is ported to line $L_2$ to the coarse side of the actuator piston 33 allowing rapid high pitch adjustment. When feather solenoid 26 is relieved of control, control 16 will begin an unfeathering sequence during which the system will limit blade pitch angle decrease until the RPM of the blades 12 nears the selected governing RPM.

The protection valve 24 is alternatively referred to as a bypass valve, the electronic control 16 is alternatively referred to as a first controller, and the controller 100 is alternately referred to as a second controller.

The technical features of the described embodiments include providing an improved electronic propeller control system having a simplified backup system for monitoring, controlling, and changing the propeller blade angles. Another feature of the described embodiments is that an electronic propeller control system is provided with a backup system for use with or as an alternative to counterweighted type propeller blades wherein the system includes a single simplified protection valve with secondary solenoid, which is operative to control various backup system features and provide improved backup propeller blade angle pitch control by modulating the pressure to the protection valve and thereby the actuator. Still another technical feature of the described embodiments is an electronic propeller control system having a backup system wherein the control system is in the form of a lighter and lower cost hydromechanical unit. Finally, yet another technical feature of described embodiments includes an electronic propeller control system having a backup system wherein the control system includes means for automatically checking the functionality of the backup system.

In this application, including the definitions below, the term "controller" may be replaced with the term "circuit," "processor," and the like. Likewise the term "module" can be replaced or interchangeable with "function", "process" and the like. The term "module" or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. In a further example, a server (also known as remote, or cloud) module may accomplish some functionality on behalf of a client module. The term code, as used above, may include software, firmware, and/or microcode, and may refer to programs, routines, functions, classes, data structures, and/or objects.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for controlling a propeller having a plurality of blades, comprising:
   a primary control system comprising:
      a sensor responsive to a propeller state, wherein the propeller state includes at least one of a propeller speed and a propeller blade angle;
      an electrohydraulic control actuator;
      a bypass valve operably connected to the electro hydraulic actuator;
      a hydraulic actuator operably connected to the bypass valve, the hydraulic actuator being operable to control at least a blade angle of a blade of the propeller;
      a first controller operably connected to the sensor and operably connected to the electrohydraulic control actuator, the first controller generating commands to the electrohydraulic control actuator based on the propeller state; and
   a backup control system comprising:
      a second controller;
      an electrohydraulic solenoid operably connected to the bypass valve; and
      the backup control system being operable to hydraulically disable the primary control system via the bypass valve upon the occurrence of a selected condition, the second controller being operable to modulate the operation of the electrohydraulic solenoid to control the hydraulic actuator based on the propeller state.

2. The system according to claim 1, wherein the backup control system is invoked if the propeller state is determined to be incompatible with selected flight requirements.

3. The system according to claim 1, wherein said blades of the propeller have in-flight blade angles including a minimum in-flight blade angle and a desired in-flight blade angle, and wherein the selected condition comprises said in-flight blade angle falling below the minimum blade angle.

4. The system according to claim 1, wherein the backup control system is configured to stop the blade angle from falling further below a minimum blade angle and for returning the blade angle to a desired in flight blade angle.

5. The system according to claim 1, wherein the sensor includes at least one rotary variable differential transformer (RVDT) operable to determine blade angle.

6. The system according to claim 1, wherein the bypass valve is a single protection valve configured to cut off control fluid from the electrohydraulic control actuator to the hydraulic actuator based upon the occurrence of the selected condition.

7. The system according to claim 6, wherein the single protection valve is operable to invoke each of a plurality of backup functions as required by the selected condition.

8. The system according to claim 7, wherein said blades of said propeller have a minimum in-flight blade angle, and wherein the plurality of backup functions include at least one of a minimum in-flight blade angle control function, and a feathering function.

9. The system according to claim 8, wherein the minimum in-flight blade angle control function is based on the modulation of the electrohydraulic solenoid, or a feathering function is based on a feathering solenoid.

10. The system according to claim 9, wherein the bypass valve is in fluid communication with each of the electrohydraulic solenoid and the feathering solenoid.

11. The system according to claim 8, wherein the hydraulic actuator includes a coarse pitch actuation mechanism and a fine pitch actuation mechanism, the bypass valve being operable to port an actuating fluid to at least one of the coarse and fine pitch actuation mechanisms for achieving the fluid communication with at least one of coarse and fine blade angle adjustment on command by the backup system.

12. The system according to claim 11, wherein the plurality of backup functions are operably configured to port the actuating fluid to each of the coarse and fine pitch actuation mechanisms.

13. The system according to claim 1, wherein the hydraulic actuator includes a coarse pitch actuation mechanism and a fine pitch actuation mechanism, the bypass valve operable to port an actuating fluid to at least one of the coarse pitch actuation mechanism and the fine pitch actuation mechanism, thereby achieving the fluid communication with at least one of coarse blade angle adjustment and fine blade angle adjustment on command by the backup system.

14. The system according to claim 1, wherein the controller is configured to execute a method comprising:
   receiving a signal indicative of the propeller state;
   comparing the signal indicative of the propeller state with a reference set point for the propeller state to establish an error signal for the propeller state based on the comparison;
   applying the error signal for the propeller state to a control function to establish a duty cycle command; and
   applying the duty cycle command to the electrohydraulic control actuator under selected conditions.

15. The system according to claim 14, wherein the control function is a proportional-integral function.

16. The system according to claim 14, wherein applying the duty cycle is implemented with a pulse width modulation of the electrohydraulic control actuator, the duty cycle in a range of 0 to 100%, the pulse width modulation operating at a frequency of at least one of at least 10 Hz, at least 20 Hz, at least 50 Hz and at least 100 Hz.

17. The system according to claim 1, wherein the electrohydraulic control actuator exhibits a bandwidth of at least one of at least 10 Hz, at least 20 Hz, at least 50 Hz and at least 100 Hz.

18. The system according to claim 1, wherein the backup control system is independent of the primary control system.

19. A method for controlling a propeller having a plurality of blades, the method comprising:
   operably connecting a sensor responsive to a propeller state, wherein the propeller state includes at least one of a propeller speed and a propeller blade angle; and
   operably connecting a first controller to the sensor and to an electrohydraulic control actuator, wherein the electrohydraulic control actuator is operably connected via a bypass valve to a hydraulic actuator, the hydraulic actuator is operable to control at least a blade angle of a blade of the propeller, the first controller generating commands to the electrohydraulic control actuator based on the propeller state; and
   operably connecting a second controller to the sensor and an electrohydraulic solenoid operably connected to the bypass valve, the electrohydraulic solenoid system being operable to hydraulically disable the electrohydraulic control actuator via the bypass valve upon the occurrence of a selected condition, the second controller being operable to modulate the operation of the electrohydraulic solenoid to control the bypass valve based on the propeller state.

20. The method of claim 19, further including the second controller further configured to:
   receive a signal indicative of the propeller state;
   compare the signal with a reference set point for the propeller state to establish an error signal for the propeller state;
   apply the error signal for the propeller state to a control function to establish a duty cycle command; and
   apply the duty cycle command to the electrohydraulic control actuator under selected conditions.

\* \* \* \* \*